United States Patent
Ito

(10) Patent No.: US 12,536,803 B2
(45) Date of Patent: Jan. 27, 2026

(54) IMAGE PROCESSING APPARATUS FOR DETECTING A TARGET, IMAGE PROCESSING METHOD FOR DETECTING A TARGET, AND NON-TRANSITORY STORAGE MEDIUM FOR DETECTING A TARGET

(71) Applicant: NEC Corporation, Tokyo (JP)

(72) Inventor: Shuya Ito, Tokyo (JP)

(73) Assignee: NEC CORPORATION, Tokyo (JP)

( * ) Notice: Subject to any disclaimer, the term of this patent is extended or adjusted under 35 U.S.C. 154(b) by 317 days.

(21) Appl. No.: 18/205,676

(22) Filed: Jun. 5, 2023

(65) Prior Publication Data

US 2023/0401867 A1    Dec. 14, 2023

(30) Foreign Application Priority Data

Jun. 8, 2022  (JP) ................................. 2022-092820

(51) Int. Cl.
| | |
|---|---|
| *G06V 20/52* | (2022.01) |
| *G06T 7/20* | (2017.01) |
| *G06V 10/25* | (2022.01) |
| *G06V 10/74* | (2022.01) |

(52) U.S. Cl.
CPC .............. *G06V 20/53* (2022.01); *G06T 7/20* (2013.01); *G06V 10/25* (2022.01); *G06V 10/761* (2022.01); *G06V 2201/07* (2022.01)

(58) Field of Classification Search
None
See application file for complete search history.

(56) References Cited

U.S. PATENT DOCUMENTS

2014/0286531 A1*  9/2014  Pham ........................ G06T 7/33
                                                                    382/103
2017/0206669 A1*  7/2017  Saleemi ................ G06T 11/206

FOREIGN PATENT DOCUMENTS

WO        2017/046872 A1      3/2017

* cited by examiner

*Primary Examiner* — Lennin R Rodriguezgonzalez
(74) *Attorney, Agent, or Firm* — Sughrue Mion, PLLC

(57) ABSTRACT

To detect a detection target by an image analysis, the present invention provides an image processing apparatus 10 including: a determination unit 11 that determines at least one of a degree of congestion, a line of movement, and a moving velocity of a person included in a plurality of images being consecutive in time series; and a presence estimated part detection unit 12 that detects, from the image, a presence estimated part being a part where a detection target is estimated to be present, based on a result of the determination.

12 Claims, 16 Drawing Sheets

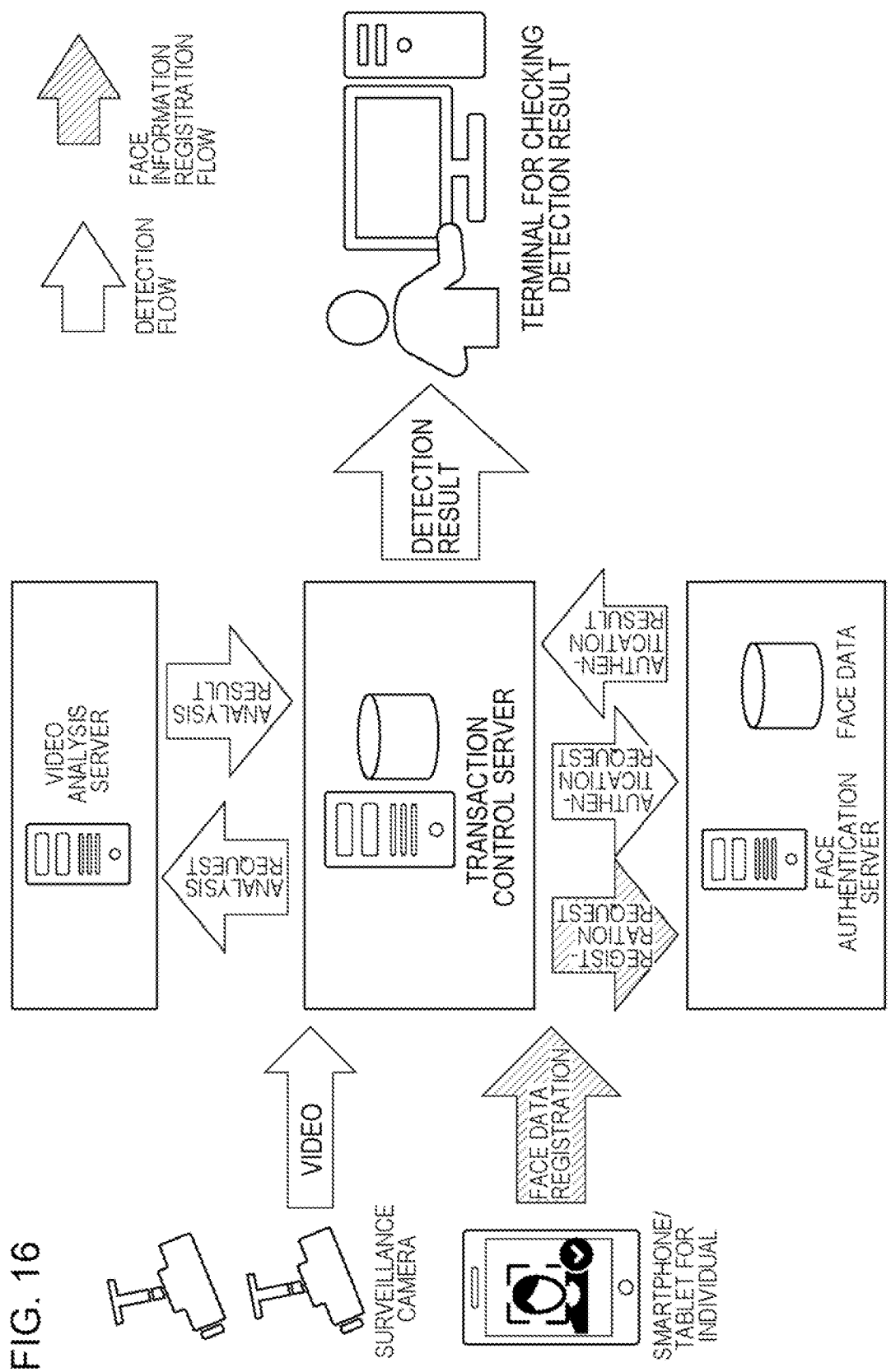

IMAGE PROCESSING APPARATUS FOR DETECTING A TARGET, IMAGE PROCESSING METHOD FOR DETECTING A TARGET, AND NON-TRANSITORY STORAGE MEDIUM FOR DETECTING A TARGET

This application is based upon and claims the benefit of priority from Japanese patent application No. 2022-92820, filed on Jun. 8, 2022, the disclosure of which is incorporated herein in its entirety by reference.

TECHNICAL FIELD

The present invention relates to an image processing apparatus, an image processing method, and a program.

BACKGROUND ART

A technique relevant to the present invention is disclosed in International Publication No. WO 2017/046872.

International Publication No. WO 2017/046872 discloses a technique for detecting, by an image analysis, a vulnerable road user such as an infant, an elderly person, a wheelchair user, or a white cane user from a crowd.

DISCLOSURE OF THE INVENTION

The present inventor has found out a following problem in a technique for detecting a detection target. A detection target cannot be detected in some cases when the detection target is hidden behind another person. International Publication No. WO 2017/046872 discloses a technique for detecting a vulnerable road user or the like from a crowd by an image analysis, but does not disclose the above problem and a solution means thereof.

In view of the above-described problem, one example of an object of the present invention is to provide an image processing apparatus, an image processing method, and a program that solve a problem of detecting a detection target by an image analysis.

According to one aspect of the present invention, provided is an image processing apparatus including:
a determination unit that determines at least one of a degree of congestion, a line of movement, and a moving velocity of a person included in a plurality of images being consecutive in time series; and
a presence estimated part detection unit that detects, from the image, a presence estimated part being a part where a detection target is estimated to be present, based on a result of the determination.

According to one aspect of the present invention, provided is an image processing method including,
by a computer:
determining at least one of a degree of congestion, a line of movement, and a moving velocity of a person included in a plurality of images being consecutive in time series; and
detecting, from the image, a presence estimated part being a part where a detection target is estimated to be present, based on a result of the determination.

According to one aspect of the present invention, provided is a program causing a computer to function as:
a determination unit that determines at least one of a degree of congestion, a line of movement, and a moving velocity of a person included in a plurality of images being consecutive in time series; and
a presence estimated part detection unit that detects, from the image, a presence estimated part being a part where a detection target is estimated to be present, based on a result of the determination.

According to one aspect of the present invention, an image processing apparatus, an image processing method, and a program that solve a problem of detecting a detection target by an image analysis are achieved.

BRIEF DESCRIPTION OF THE DRAWINGS

The above-described object and other objects, features, and advantageous effects become more apparent from the preferred example embodiments described below and the following accompanying drawings.

FIG. 16 is a diagram for describing an example.

DESCRIPTION OF EMBODIMENTS

Hereinafter, example embodiments of the present invention will be described below by using drawings. Note that, in every drawing, a similar component is given a similar signs, and description thereof is omitted as appropriate.

First Example Embodiment

Figure 1:
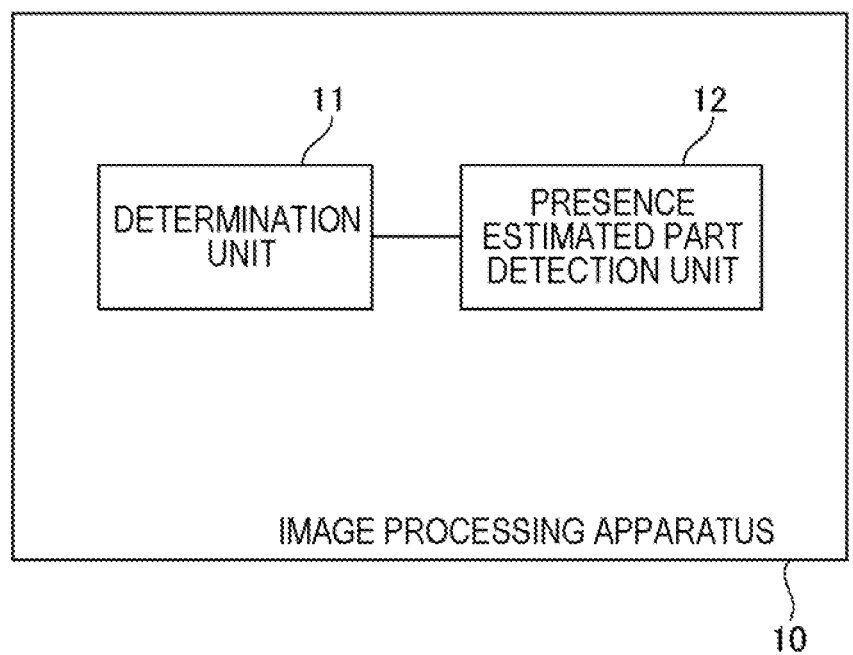
FIG. 1 is a diagram illustrating one example of a function block diagram of an image processing apparatus.

FIG. 1 is a function block diagram illustrating an overview of an image processing apparatus 10 according to a first example embodiment. The image processing apparatus 10 includes a determination unit 11 and a presence estimated part detection unit 12.

The determination unit 11 determines at least one of a degree of congestion, a line of movement, and a moving velocity of a person included in a plurality of images being consecutive in time series. The presence estimated part detection unit 12 detects, from the image, a presence estimated part being a part where a detection target is estimated to be present, based on a result of the determination by the determination unit 11.

The image processing apparatus 10 including such a configuration solves a problem of detecting a detection target by an image analysis.

Second Example Embodiment

"Overview"

An image processing apparatus 10 according to a second example embodiment is a more specific embodiment of the image processing apparatus 10 according to the first example embodiment.

Incidentally, a technique for detecting a detection target from a crowd has, for example, a problem as follows. When a feature of appearance identifying a detection target is captured in an image, the detection target can be detected from the image by detecting the feature of appearance. However, when a detection target is in a crowd, the detection target may be hidden behind another person and a feature of appearance identifying the detection target may not be captured in an image. Thus, a detection target cannot be detected from a crowd with high accuracy merely by a means for detecting a feature of appearance identifying a detection target from an image. The image processing apparatus 10 includes a means for detecting a detection target from a crowd with high accuracy by an image analysis.

A detection target is a target (including a person and an object) that needs some support or action, and examples thereof include, but not limited to, for example, a wheelchair user, a white cane user, a crutch user, a sick person, an injured person, a lost child, other persons who need support, a fallen object, a dropped object, and other obstacles. Such a detection target may not move but remain where the detection target is, or may move at a moving velocity slower than another person. Thus, another person tends to move avoiding a position where the detection target is.

Consequently, when a detection target is present in a crowd of people, features such as follows appear.

(Feature 1) A part with a low degree of congestion of persons (a part where a detection target is present) is present within an area (a crowd of people) where a degree of congestion of persons is high.

(Feature 2) A part where a person passes through in normal times (when a detection target is absent) but persons in a crowd of people avoid and pass by (a part where a detection target is present) is present.

(Feature 3) A person (a detection target) who moves at a moving velocity slower than surrounding persons is present in a crowd of people.

The image processing apparatus 10 detects a detection target from a crowd, based on at least one of such features. In a case of the processing, a detection target can be detected from an image, even when a feature of appearance identifying the detection target is not captured in the image. Hereinafter, a configuration of the image processing apparatus 10 will be described in detail.

"Hardware Configuration"

Next, one example of a hardware configuration of the image processing apparatus 10 will be described. Each function unit of the image processing apparatus 10 is achieved by any combination of hardware and software, mainly including a central processing unit (CPU) of any computer, a memory, a program to be loaded in a memory, a storage unit (in which a program downloaded from a storage medium such as a compact disc (CD), a server on the Internet, or the like can be stored as well as a program stored in advance in a stage of shipping an apparatus) such as a hard disk for storing the program, and an interface for network connection. In addition, it should be understood by a person skilled in the art that there are a variety of modified examples of a method or an apparatus for achieving the same.

Figure 2:
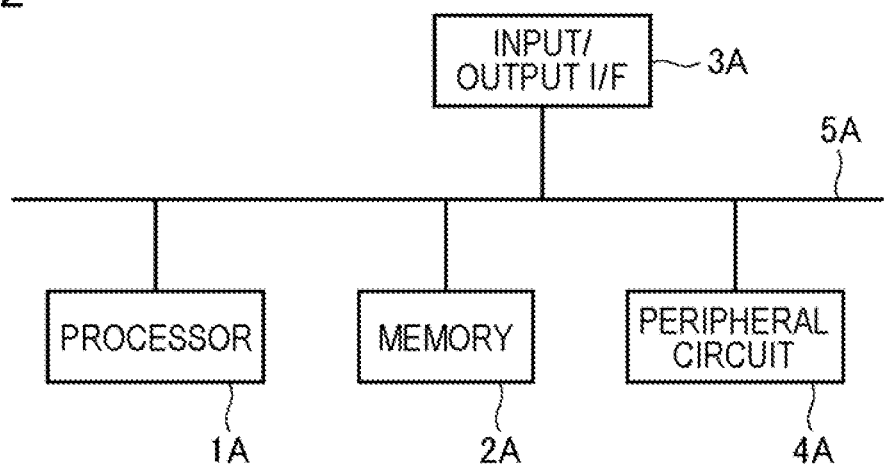
FIG. 2 is a diagram illustrating one example of a hardware configuration of an image processing apparatus.

FIG. 2 is a block diagram illustrating a hardware configuration of the image processing apparatus 10. As illustrated in FIG. 2, the image processing apparatus 10 includes a processor 1A, a memory 2A, an input/output interface 3A, a peripheral circuit 4A, and a bus 5A. The peripheral circuit 4A includes various modules. The image processing apparatus 10 may not include the peripheral circuit 4A. Note that, the image processing apparatus 10 may be configured by a plurality of physically and/or logically separated apparatuses. In this case, each of the plurality of apparatuses can include the above hardware configuration.

The bus 5A is a data transmission path through which the processor 1A, the memory 2A, the peripheral circuit 4A, and the input/output interface 3A transmit and receive data to and from one another. The processor 1A is an arithmetic processing apparatus such as, for example, a CPU or a graphics processing unit (GPU). The memory 2A is a memory such as, for example, a random access memory (RAM) or a read only memory (ROM). The input/output interface 3A includes an interface for acquiring information from an input apparatus, an external apparatus, an external server, an external sensor, a camera, and the like, an interface for outputting information to an output apparatus, an external apparatus, an external server, and the like, and the like. The input apparatus is, for example, a keyboard, a mouse, a microphone, a physical button, a touch panel, and the like. The output apparatus is, for example, a display, a speaker, a printer, a mailer, and the like. The processor 1A can give an instruction to each module to perform an arithmetic operation, based on an arithmetic operation result thereof "Function Configuration"

Figure 3:
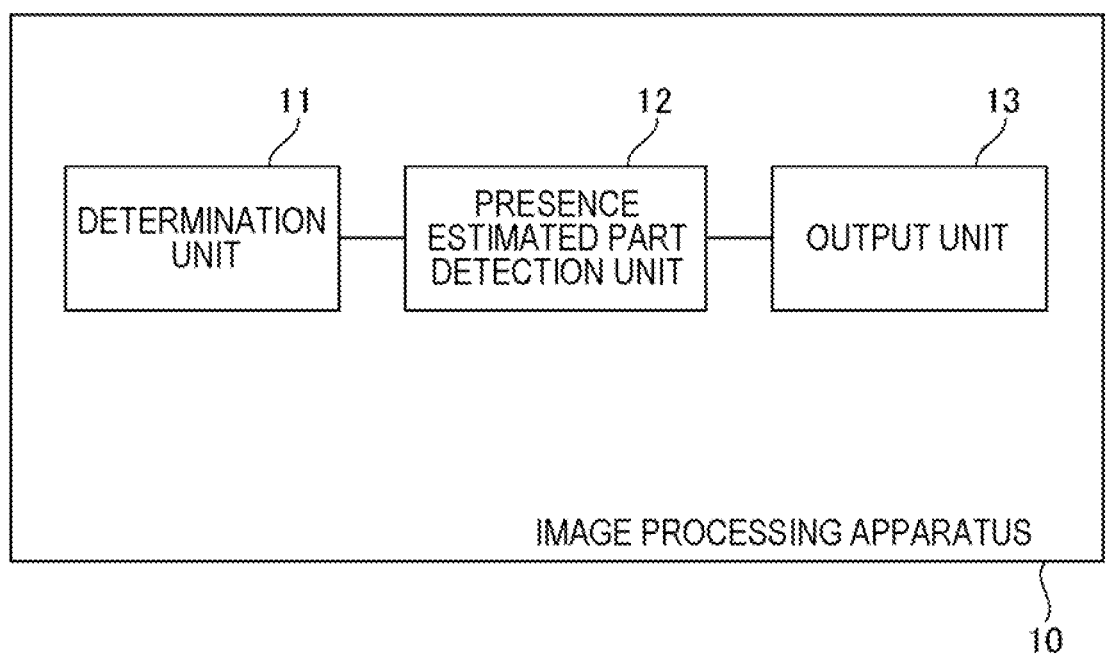
FIG. 3 is a diagram illustrating one example of a function block diagram of the image processing apparatus.

Next, a function configuration of the image processing apparatus 10 according to the second example embodiment will be described in detail. FIG. 3 illustrates one example of a function block diagram of the image processing apparatus 10. As illustrated, the image processing apparatus 10 includes a determination unit 11, a presence estimated part detection unit 12, and an output unit 13.

The determination unit 11 determines at least one of a degree of congestion, a line of movement, and a moving velocity of a person included in a plurality of images being consecutive in time series. Then, the presence estimated part detection unit 12 detects, from the image, a presence estimated part being a part where a detection target is estimated to be present, based on a result of the determination by the determination unit 11. The presence estimated part detection unit 12 detects a presence estimated part from the image, based on, for example, a relative positional relationship between a congested area and an uncongested area, a tendency in lines of movement of a plurality of persons (a tendency of avoiding a certain part), and a tendency between moving velocities of a plurality of persons.

A "plurality of images being consecutive in time series" may be, for example, a plurality of frame images constituting a moving image. Besides the above, a plurality of images being consecutive in time series may be a plurality of still images consecutively photographed at relatively short time intervals. The image is, for example, an image photographed by a surveillance camera.

A "presence estimated part" is at least one part of an image, and is a part where a detection target is estimated to be present, based on at least one of a degree of congestion, a line of movement, and a moving velocity of a person in an image.

Hereinafter, a specific example of processing of detecting a presence estimated part based on at least one of a degree of congestion, a line of movement, and a moving velocity of a person in an image will be described. The image processing apparatus 10 can execute one or a plurality of pieces of following processing.

"Processing (1) of Detecting a Presence Estimated Part Based on a Degree of Congestion of Persons in an Image"

In the processing, a presence estimated part is detected based on the above-described "(Feature 1) A part with a low degree of congestion of persons (a part where a detection target is present) is present within an area (a crowd of people) where a degree of congestion of persons is high". The presence estimated part detection unit 12 detects a "part with a low degree of congestion of persons within an area where a degree of congestion of persons is high", as a presence estimated part. There are a variety of means for detecting a "part with a low degree of congestion of persons within an area where a degree of congestion of persons is high" by an image analysis, and any possible means can be employed in the present example embodiment. Hereinafter, one example of the processing will be described.

Figure 5:
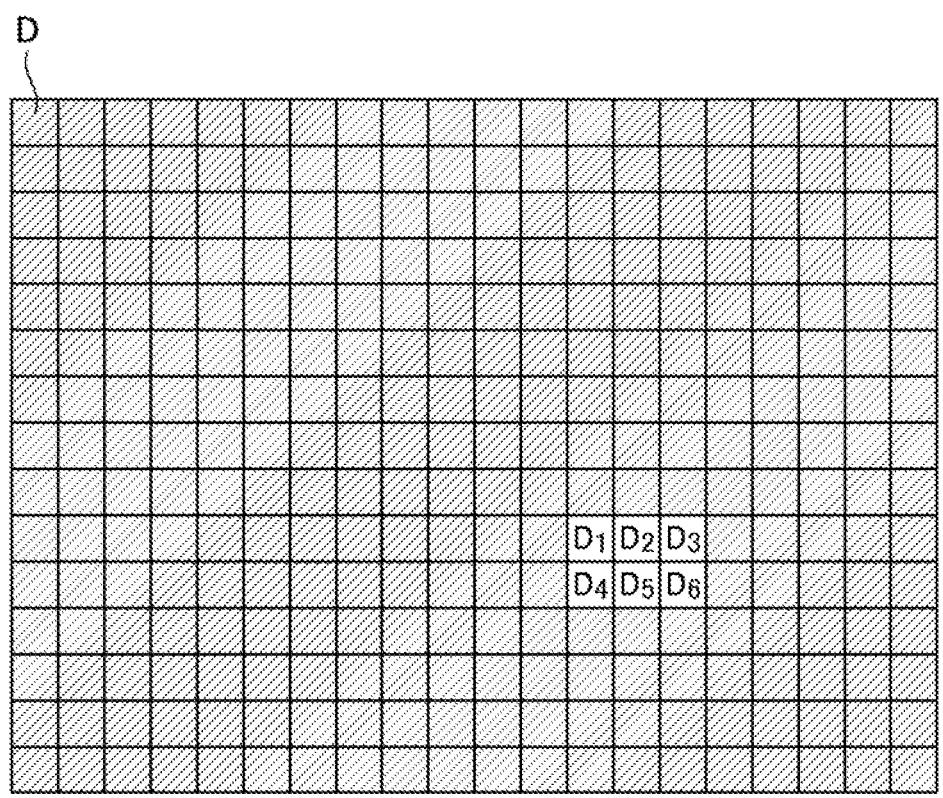
FIG. 5 is a diagram for describing one example of processing of detecting a presence estimated part, based on a line of movement of a person.

The determination unit 11 divides an image into a plurality of observation areas. The determination unit 11 divides an image into a plurality of grid-shaped observation areas D, as illustrated in, for example, FIG. 5. Then, the determination unit 11 computes the number of present persons for each observation area D. A means for computing the number of present persons for each observation area D is not particularly limited. For example, the determination unit 11 detects a person from an image by using a human detection technique (an image analysis technique). Then, the determination unit 11 counts the number of present persons for each observation area D. For example, the determination unit 11 may detect a predetermined part (top of head, nose, foot, or the like) of a body of a person present in an image, and may count the number of the present predetermined parts for each observation area D as the number of present persons.

In the example, the determination unit 11 determines the number of present persons (a degree of congestion) for each observation area D in a way as described above. Then, based on a result of the determination, the presence estimated part detection unit 12 detects, as a presence estimated part, a part that is surrounded by an area where the number of present persons (a degree of congestion) is equal to or more than a first congestion reference value, and where the number of present persons (a degree of congestion) is less than a second congestion reference value.

Herein, the observation area D where the number of present persons (a degree of congestion) is equal to or more than the first congestion reference value is called a "congested observation area". Then, the observation area D where the number of present persons (a degree of congestion) is less than the second congestion reference value is called an "uncongested observation area". In a case of the example in FIG. 5, the hatched observation area D is a congested observation area, and observation areas $D_1$ to $D_6$ are uncongested observation areas.

An "area where the number of present persons (a degree of congestion) is equal to or more than the first congestion reference value" is an area composed of a plurality of congested observation areas. Then, the presence estimated part detection unit 12 detects one or a plurality of uncongested observation areas surrounded by such an "area where the number of present persons (a degree of congestion) is equal to or more than the first congestion reference value", as a presence estimated part. In a case of the example in FIG. 5, the presence estimated part detection unit 12 detects the observation areas $D_1$ to $D_6$ being uncongested observation areas surrounded by the hatched observation area D, as a presence estimated part.

"Processing (2) of Detecting a Presence Estimated Part Based on a Degree of Congestion of Persons in an Image"

In the processing, a presence estimated part is detected based on the above-described "(Feature 1) A part with a low degree of congestion of persons (a part where a detection target is present) is present within an area (a crowd of people) where a degree of congestion of persons is high". The presence estimated part detection unit 12 detects a "part where a degree of congestion of persons is low within an area where a degree of congestion of persons is high, and where the state continues for a predetermined period of time or more", as a presence estimated part. There are a variety of means for detecting a "part where a degree of congestion of persons is low within an area where a degree of congestion of persons is high, and where the state continues for a predetermined period of time or more" by an image analysis, and any possible means can be employed in the present example embodiment. Note that, a "predetermined period of time" may be defined by a length of time, or may be defined by the number of consecutive images. Hereinafter, one example of the processing will be described.

The determination unit 11 determines the number of present persons (a degree of congestion) for each observation area D, in a way similar to the processing described in the "processing (1) of detecting a presence estimated part based on a degree of congestion of persons in an image". Then, the presence estimated part detection unit 12 detects, from each of a plurality of images, one or a plurality of uncongested observation areas surrounded by an "area where the number of present persons (a degree of congestion) is equal to or more than the first congestion reference value", as a candidate for a presence estimated part, in a way similar to the processing described in the "processing (1) of detecting a presence estimated part based on a degree of congestion of persons in an image".

Then, the presence estimated part detection unit 12 detects, as a presence estimated part, a candidate for a presence estimated part detected at a same position continuingly for a predetermined period of time or more (for example, in a predetermined number or more of consecutive images). The processing will be described by using FIG. 4.

Figure 4:
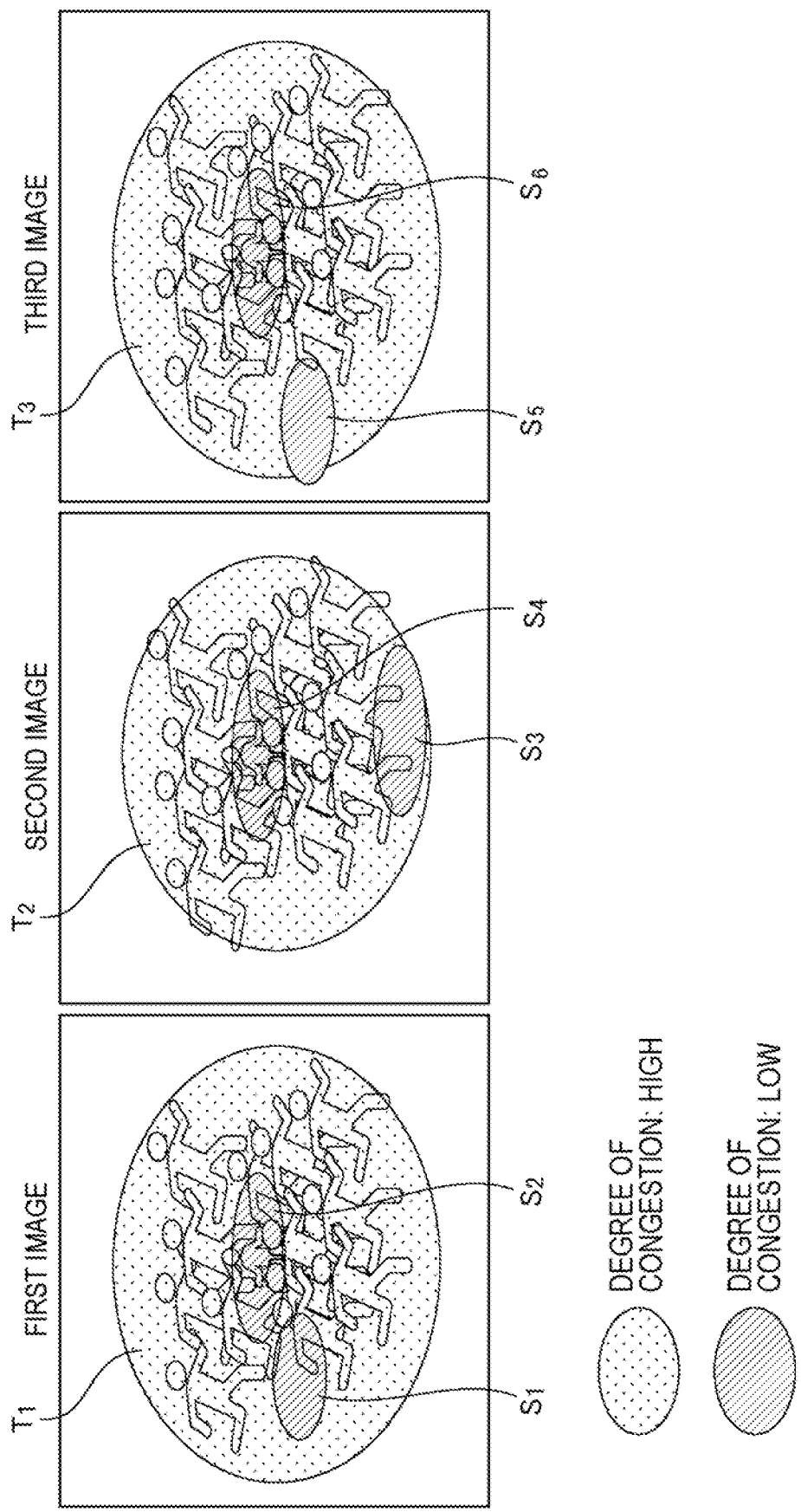
FIG. 4 is a diagram for describing one example of processing of detecting a presence estimated part, based on a degree of congestion of persons.

FIG. 4 illustrates three images being consecutive in time series. In a first image, an area $T_1$ in which the number of present persons (a degree of congestion) is equal to or more than the first congestion reference value, and candidates $S_1$ and $S_2$ for a presence estimated part surrounded by the area $T_1$ are detected. In a second image, an area $T_2$ in which the number of present persons (a degree of congestion) is equal to or more than the first congestion reference value, and candidates $S_3$ and $S_4$ for a presence estimated part surrounded by the area $T_2$ are detected. In a third image, an area $T_3$ in which the number of present persons (a degree of congestion) is equal to or more than the first congestion reference value, and candidates $S_5$ and $S_6$ for a presence estimated part surrounded by the area $T_3$ are detected.

In a case of an example in FIG. 4, positions of the candidates $S_2$, $S_4$, and $S_6$ for a presence estimated part in the images match one another. In other words, a presence estimated part is detected at a same position in the three consecutive images. Thus, the presence estimated part detection unit 12 detects the candidates $S_2$, $S_4$, and $S_6$ for a presence estimated part as a presence estimated part.

Note that, a "position of a candidate for a presence estimated part" can be any point (for example, a center) in an area occupied by a candidate for a presence estimated part. Then, a "criterion for determining that positions of two candidates for a presence estimated part match each other (are the same)" may be an exact match, or may be defined as a state that a difference therebetween is within a threshold value. Besides the above, when two candidates for a presence estimated part detected from two different images at least partially overlap each other, positions of the two candidates for a presence estimated part in the images may be determined as matching each other.

"Processing (1) of Detecting a Presence Estimated Part Based on a Line of Movement"

In the processing, a presence estimated part is detected based on the above-described "(Feature 2) A part where a person passes through in normal times (when a detection target is absent) but persons in a crowd of people avoid and pass by (a part where a detection target is present) is present". The presence estimated part detection unit 12 detects a "part where persons in a crowd of people avoid and pass by", as a presence estimated part. There are a variety of means for detecting a "part where persons in a crowd of people avoid and pass by" by an image analysis, and any possible means can be employed in the present example embodiment. Hereinafter, one example of the processing will be described.

The determination unit 11 detects a person from an image by using a human detection technique (an image analysis technique), and then detects a line of movement (a locus of movement) of each of the detected persons. Detection of a line of movement of a person can be achieved by using any possible technique.

Figure 6:
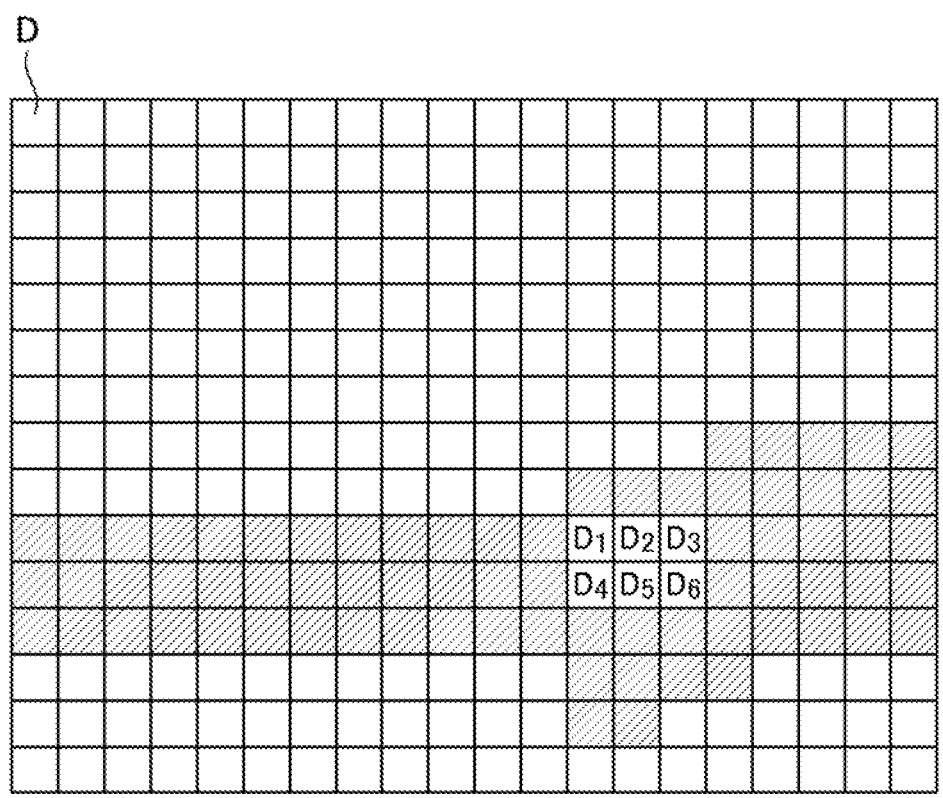
FIG. 6 is a diagram for describing another example of processing of detecting a presence estimated part, based on a line of movement of a person.

Then, the presence estimated part detection unit 12 determines, based on the computed line of movement, a part where no person in the image passes through, as a presence estimated part. For example, the presence estimated part detection unit 12 divides an image into a plurality of observation areas D, as illustrated in FIG. 6. Then, the presence estimated part detection unit 12 determines an observation area D where a line of movement computed by the determination unit 11 passes through as an area where a person in the image passes through, and determines an observation area D where no line of movement passes through as an area (a presence estimated part) where no person in the image passes through. Besides the above, the presence estimated part detection unit 12 may determine an observation area D where lines of movement for a predetermined number or more of persons pass through as an area where a person in the image passes through, and may determine an observation area D where lines of movement for less than a predetermined number of persons pass through and an observation area D where no line of movement passes through as an area (a presence estimated part) where no person in the image passes through. In an example in FIG. 6, the observation area D determined as an area where a person passes through is hatched. Then, observation areas $D_1$ to $D_6$ are determined as an area (a presence estimated part) where no person in the image passes through.

"Processing (2) of Detecting a Presence Estimated Part Based on a Line of Movement"

In the processing, a presence estimated part is detected based on the above-described "(Feature 2) A part where a person passes through in normal times (when a detection target is absent) but persons in a crowd of people avoid and pass by (a part where a detection target is present) is present". The presence estimated part detection unit 12 detects a "part where a state in which persons in a crowd of people avoid and pass by continues for a predetermined period of time or more", as a presence estimated part. There are a variety of means for detecting a "part where a state in which persons in a crowd of people avoid and pass by continues for a predetermined period of time or more" by an image analysis, and any possible means can be employed in the present example embodiment. Note that, a "predetermined period of time" may be defined by a length of time, or may be defined by the number of consecutive images. Hereinafter, one example of the processing will be described.

The presence estimated part detection unit 12 detects the observation area D where no person in an image passes through, by an approach described in the "processing (1) of detecting a presence estimated part based on a line of movement". Then, the presence estimated part detection unit 12 detects the observation area D where no person in an image passes through continuingly for a predetermined period of time or more (for example, in a predetermined number or more of consecutive images), as a presence estimated part.

"Processing (3) of Detecting a Presence Estimated Part Based on a Line of Movement"

In the processing, a presence estimated part is detected based on the above-described "(Feature 2) A part where a person passes through in normal times (when a detection target is absent) but persons in a crowd of people avoid and pass by (a part where a detection target is present) is present". The presence estimated part detection unit 12 detects a "part where a person passes through in normal times (when a detection target is absent) but persons in a crowd of people avoid and pass by", as a presence estimated part. There are a variety of means for detecting a "part where a person passes through in normal times (when a detection target is absent) but persons in a crowd of people avoid and pass by" by an image analysis, and any possible means can be employed in the present example embodiment. Hereinafter, one example of the processing will be described.

The determination unit 11 detects a person from an image by using a human detection technique (an image analysis technique), and then detects a line of movement (a locus of movement) of each of the detected persons. Detection of a line of movement of a person can be achieved by using any possible technique.

Figure 7:
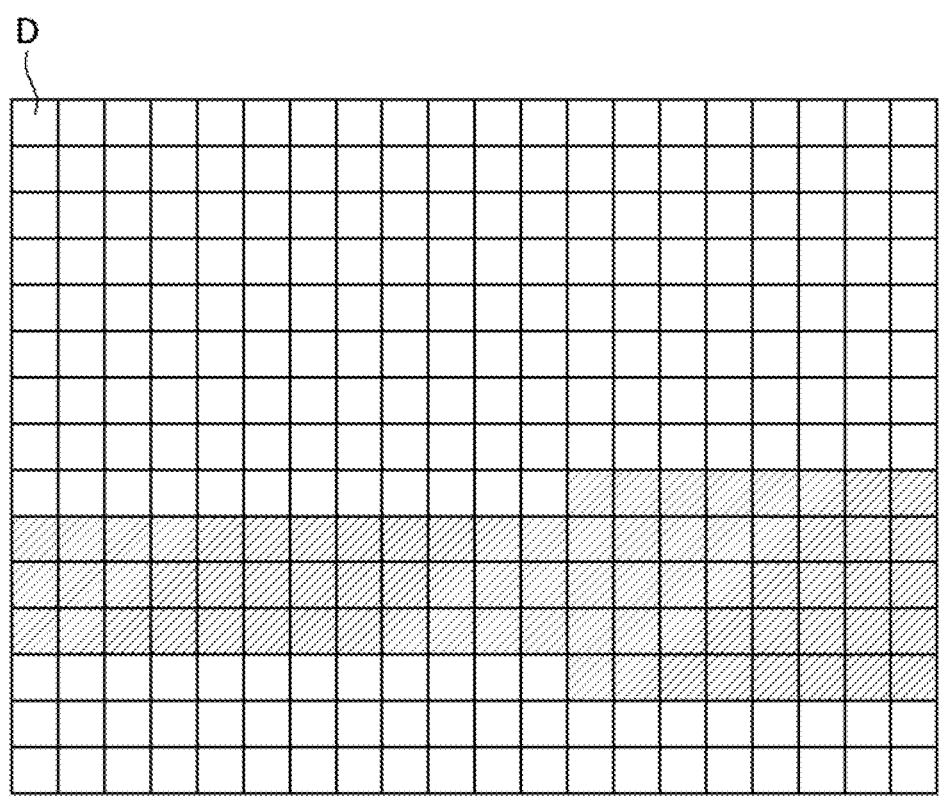
FIG. 7 is a diagram for describing another example of processing of detecting a presence estimated part, based on a line of movement of a person.

Then, the presence estimated part detection unit 12 determines, based on the computed line of movement, a part where no person in the image passes through. For example, the presence estimated part detection unit 12 divides an image into a plurality of observation areas D, as illustrated in FIG. 7. Then, the presence estimated part detection unit 12 determines an observation area D where a line of movement computed by the determination unit 11 passes through as an area where a person in the image passes through, and determines an observation area D where no line of movement passes through as an area where no person in the image passes through. Besides the above, the presence estimated part detection unit 12 may determine an observation area D where lines of movement for a predetermined number or more of persons pass through as an area where a person in the image passes through, and may determine an observation area D where lines of movement for less than a predetermined number of persons pass through and an observation area D where no line of movement passes through as an area where no person in the image passes through. In an example in FIG. 7, the observation area D determined as an area where a person in the image passes through is hatched.

Further, in the example, reference information indicating a line of movement of a person in normal times (when a detection target is absent) is generated in advance. Then, the presence estimated part detection unit 12 determines, based on the reference information, whether a person passes through in normal times for each observation area D, as illustrated in FIG. 7. A criterion for determination is the same criterion for the above-described determination as to whether a person in an image passes through. In an example in FIG. 7, the observation area D determined as an area where a person passes through in normal times is hatched.

Then, the presence estimated part detection unit 12 detects, based on data in FIGS. 6 and 7, the observation area D where a person passes through in normal times but no person in the image passes through, as a presence estimated part. In examples in FIGS. 6 and 7, observation areas $D_1$ to $D_6$ are determined as an area (a presence estimated part) where a person passes through in normal times but no person in the image passes through.

"Processing (4) of Detecting a Presence Estimated Part Based on a Line of Movement"

In the processing, a presence estimated part is detected based on the above-described "(Feature 2) A part where a person passes through in normal times (when a detection target is absent) but persons in a crowd of people avoid and pass by (a part where a detection target is present) is present". The presence estimated part detection unit 12 detects a "part where a person passes through in normal times (when a detection target is absent) but a state in which persons in a crowd of people avoid and pass by continues for a predetermined period of time or more", as a presence estimated part. There are a variety of means for detecting a "part where a person passes through in normal times (when a detection target is absent) but a state in which persons in a crowd of people avoid and pass by continues for a predetermined period of time or more" by an image analysis, and any possible means can be employed in the present example embodiment. Note that, a "predetermined period of time" may be defined by a length of time, or may be defined by the number of consecutive images. Hereinafter, one example of the processing will be described.

The presence estimated part detection unit 12 detects the observation area D where a person passes through in normal times (when a detection target is absent) but no person in an image passes through, by an approach described in the "processing (3) of detecting a presence estimated part based on a line of movement". Then, the presence estimated part detection unit 12 detects the observation area D where a person passes through in normal times (when a detection target is absent) but no person in an image passes through continuingly for a predetermined period of time or more (for example, in a predetermined number or more of consecutive images), as a presence estimated part.

"Processing of Detecting a Presence Estimated Part Based on a Moving Velocity"

In the processing, a presence estimated part is detected based on the above-described "(Feature 3) A person (a detection target) who moves at a moving velocity slower than surrounding persons is present in a crowd of people". The presence estimated part detection unit 12 detects a "part where a person who moves at a moving velocity of less than a velocity reference value is present", as a presence estimated part. There are a variety of means for detecting a "part where a person who moves at a moving velocity of less than a velocity reference value is present" by an image analysis, and any possible means can be employed in the present example embodiment. Hereinafter, one example of the processing will be described.

The determination unit 11 detects a person from an image by using a human detection technique (an image analysis technique), and then detects a moving velocity of each of the detected persons. Detection of a moving velocity can be achieved by using any possible technique.

Then, the presence estimated part detection unit 12 detects a part where a person who moves at a moving velocity of less than a velocity reference value is present, as a presence estimated part.

The velocity reference value may be a value determined in advance. By determining the velocity reference value based on a moving velocity (a walking velocity) of a general person, a person who moves at a moving velocity slower than a moving velocity of a general person can be detected. For example, the velocity reference value may be a moving velocity of a general person, or the velocity reference value may be any velocity slower than a moving velocity of a general person.

Besides the above, the velocity reference value may be a value computed based on a moving velocity of a plurality of persons included in an image. By determining the velocity reference value based on a moving velocity of a plurality of persons included in an image, a person who moves at a moving velocity slower than a moving velocity of a plurality of persons included in an image can be detected. For example, the velocity reference value may be a moving velocity of a plurality of persons included in an image, or the velocity reference value may be any velocity slower than a moving velocity of a plurality of persons included in an image. A moving velocity of a plurality of persons included in an image can be a statistical value (a mean value, a maximum value, a minimum value, a mode value, a median value, or the like) of moving velocities of a plurality of persons included in an image.

The output unit 13 outputs information indicating a presence estimated part detected by the presence estimated part detection unit 12. For example, the output unit 13 causes an output apparatus such as a display, a projection apparatus, or a printer to output information indicating a detected presence estimated part.

Figure 8:
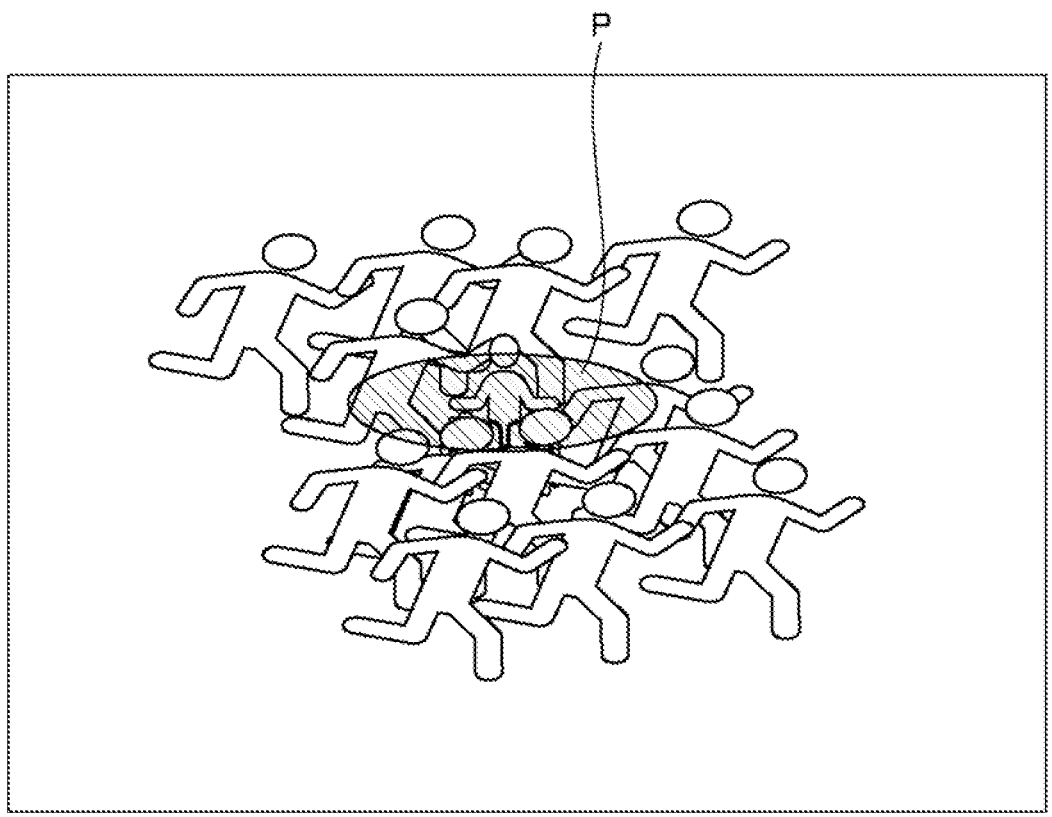
FIG. 8 is a diagram illustrating one example of information output by the image processing apparatus.

For example, the output unit 13 may output an image in which information P indicating a detected presence estimated part is superimposed on the above-described image processed by the determination unit 11 (the image processed in order to determine at least one of a degree of congestion, a line of movement, and a moving velocity of a person), as illustrated in FIG. 8. For example, the image processed by the determination unit 11 may be an image photographed by a surveillance camera, and the image may be displayed on a display in real time for surveillance. Then, the output unit 13 may display the information P indicating a detected presence estimated part, in a way superimposed on the image displayed in real time on the display.

Figure 9:
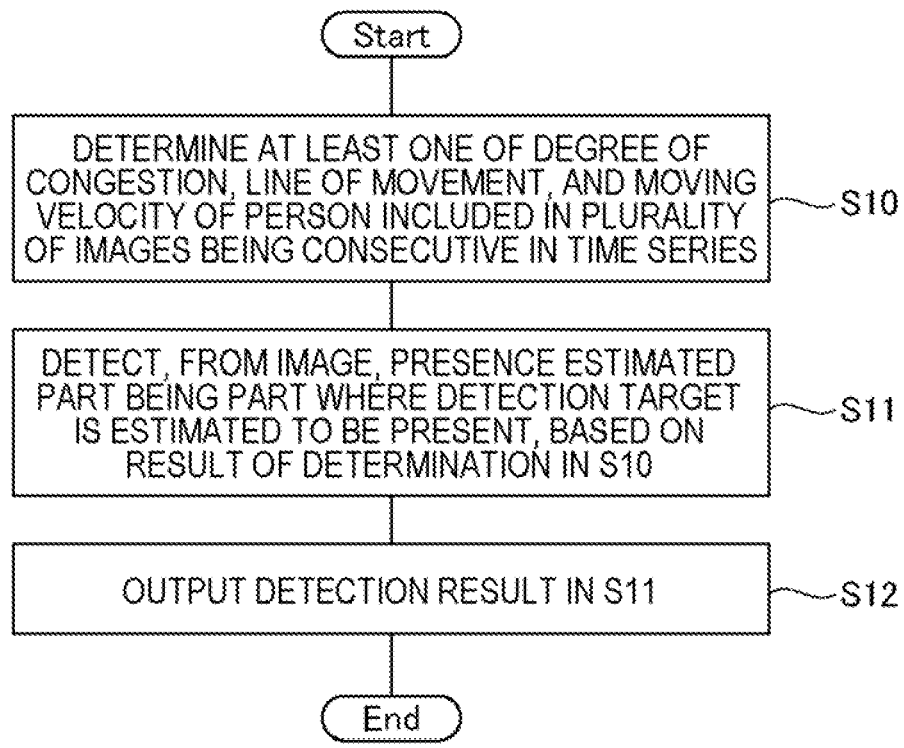
FIG. 9 is a flowchart illustrating one example of a flow of processing of the image processing apparatus.

Next, one example of a flow of processing of the image processing apparatus 10 will be described by using a flowchart in FIG. 9. The image processing apparatus 10 acquires a plurality of images being consecutive in time series in generation order, and repeats processing of S10 to S12 every time acquiring each image.

First, the image processing apparatus 10 determines at least one of a degree of congestion, a line of movement, and a moving velocity of a person included in an acquired image (S10). A line of movement or a moving velocity of a person is computed based on a newly acquired image and one or more images acquired earlier.

Then, the image processing apparatus 10 detects, from the image, a presence estimated part being a part where a detection target is estimated to be present, based on a result of the determination in S10 (S11). Then, the image processing apparatus 10 outputs information indicating the presence estimated part detected in S11 (S12).

Advantageous Effect

The image processing apparatus 10 according to the present example embodiment determines a part (a presence estimated part) where a detection target is estimated to be present, based on at least one of a degree of congestion, a line of movement, and a moving velocity of a person included in an image, rather than a feature of appearance identifying the detection target. The image processing apparatus 10 as described above can detect a detection target from an image, even when a feature of appearance identifying the detection target is not captured in the image.

Further, the image processing apparatus 10 determines a part where a detection target is estimated to be present, based on at least one of the above-described features 1 to 3 appearing when the detection target is present in a crowd of people. The image processing apparatus 10 as described above can determine a part where a detection target is estimated to be present with high accuracy.

Third Example Embodiment

An image processing apparatus 10 according to a third example embodiment performs both of processing of determining a part (a presence estimated part) where a detection target is estimated to be present, based on at least one of a degree of congestion, a line of movement, and a moving velocity of a person included in an image and processing of detecting a detection target, based on a feature of appearance of the detection target. Hereinafter, description will be given in detail.

Figure 10:
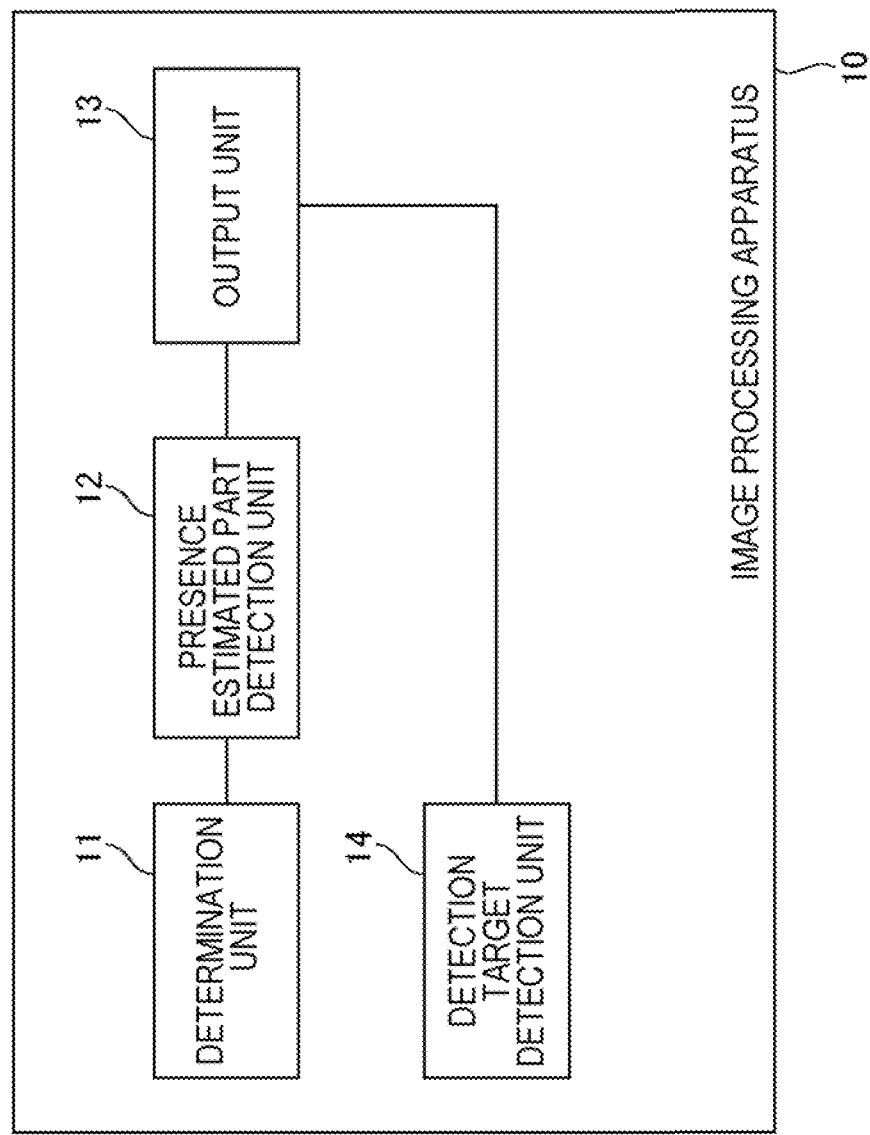
FIG. 10 is a diagram illustrating one example of a function block diagram of an image processing apparatus.

FIG. 10 illustrates one example of a function block diagram of the image processing apparatus 10 according to the present example embodiment. As illustrated, the image processing apparatus 10 includes a determination unit 11, a presence estimated part detection unit 12, an output unit 13, and a detection target detection unit 14.

The detection target detection unit 14 detects a detection target from an image, based on a feature value of appearance of the detection target. For example, the detection target detection unit 14 may detect a detection target by detecting, using an object detection technique, an object (a wheelchair, a white cane, a crutch, or the like) for use by the detection target. Besides the above, the detection target detection unit 14 may detect a detection target by detecting, using a pose detection technique for detecting a human pose, a person who takes a peculiar pose when using an object (a wheelchair, a white cane, a crutch, or the like) for use by a detection target or a person who takes a peculiar pose (lying down, crouching down, or the like) when being in a predetermined state such as a sick person or an injured person.

Besides the above, the detection target detection unit 14 may detect a detection target by detecting, using a face recognition technique, a person whose face image is registered in advance as a detection target.

Besides the above, the detection target detection unit 14 may detect a detection target by detecting, using an object detection technique, an object (example: a fallen signboard, a fallen tree, or the like) registered in advance as a detection target.

The output unit 13 outputs information indicating a presence estimated part detected by the presence estimated part detection unit 12 and, in addition thereto, information indicating a detection target detected by the detection target detection unit 14. For example, the output unit 13 causes an output apparatus such as a display, a projection apparatus, or a printer to output information indicating a detected presence estimated part and information indicating a detected detection target.

Figure 11:
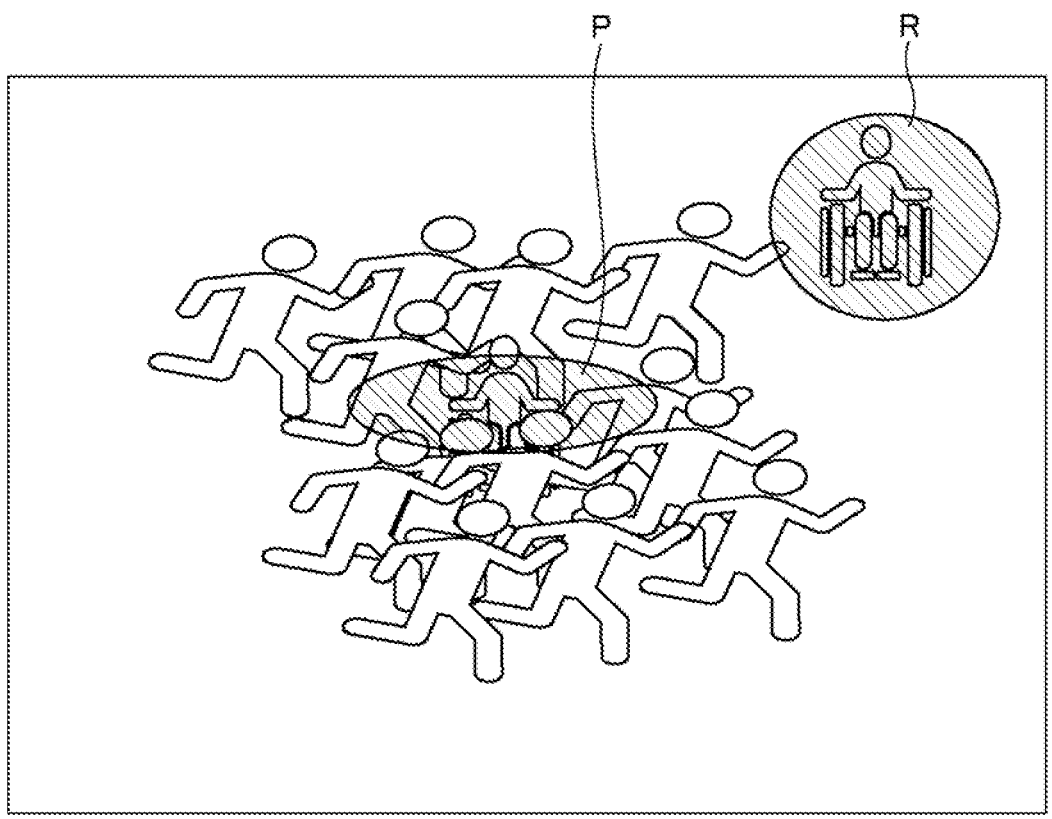
FIG. 11 is a diagram illustrating one example of information output by the image processing apparatus.

For example, the output unit 13 may output an image in which information P indicating a detected presence estimated part and information R indicating a detected detection target are superimposed on the above-described image processed by the determination unit 11 (the image processed in order to determine at least one of a degree of congestion, a line of movement, and a moving velocity of a person), as illustrated in FIG. 11. The information P indicating a detected presence estimated part and the information R indicating a detected detection target may be mutually identifiable information. For example, conceivable examples include making a mark different in shape, color, shade, or the like, but a means for achieving the same is not limited thereto.

For example, the image processed by the determination unit 11 may be an image photographed by a surveillance camera, and the image may be displayed on a display in real time for surveillance. Then, the output unit 13 may display the information P indicating a detected presence estimated part and the information R indicating a detected detection target, in a way superimposed on the image displayed in real time on the display.

Note that, the information R indicating a detection target to be output may include information indicating a detail of a detection result, in addition to information indicating a position of the detection target. For example, the information R indicating a detection target to be output may include information indicating what is detected (a person whose face image is preliminarily registered, a wheelchair user, a white cane user, a crutch user, a sick person, an injured person, a lost child, other persons who need support, a fallen object, a dropped object, other obstacles, or the like) as a detection target. Further, when a person whose face image is preliminarily registered is detected, the information R indicating a detection target to be output may further include the preliminarily registered face image.

Figure 12:
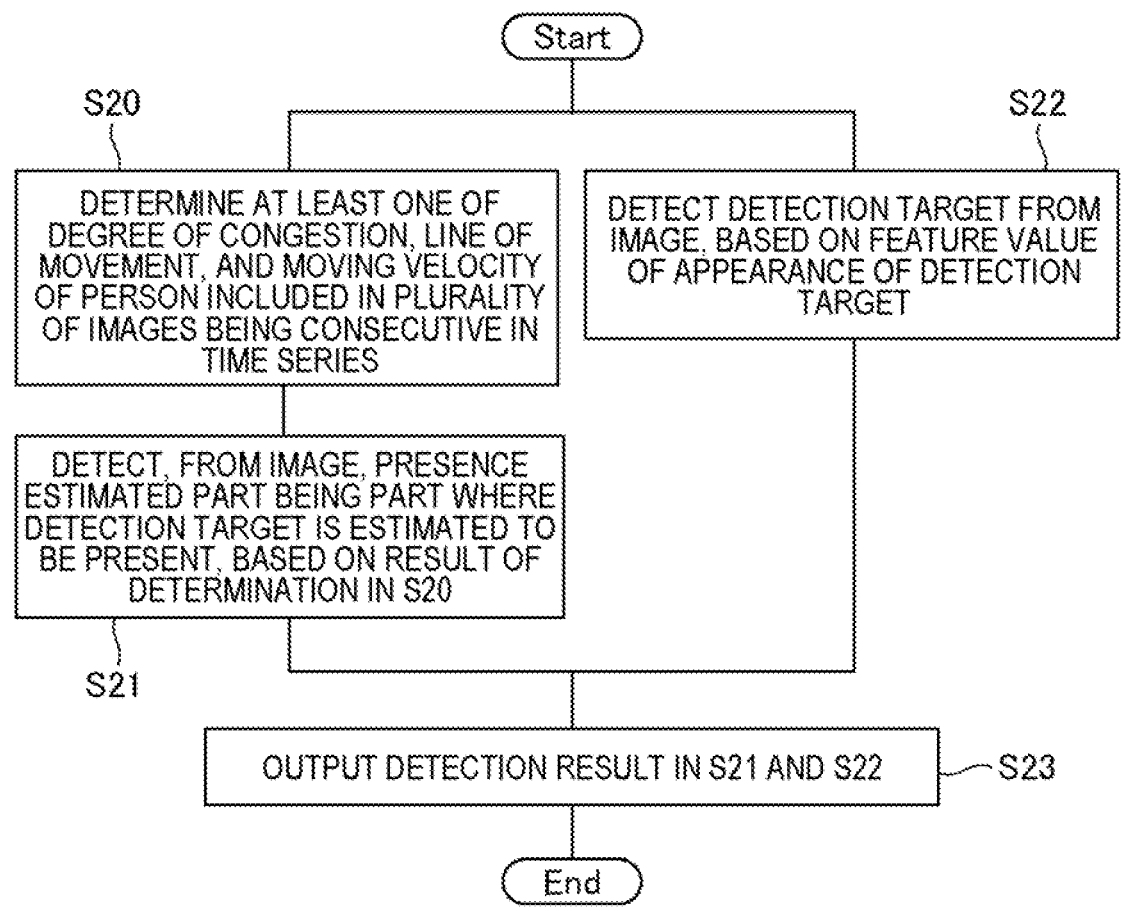
FIG. 12 is a flowchart illustrating one example of a flow of processing of the image processing apparatus.

Next, one example of a flow of processing of the image processing apparatus 10 will be described by using a flowchart in FIG. 12. The image processing apparatus 10 acquires a plurality of images being consecutive in time series in generation order, and repeats processing of S20 to S23 every time acquiring each image.

First, the image processing apparatus 10 determines at least one of a degree of congestion, a line of movement, and a moving velocity of a person included in an acquired image (S20). A line of movement or a moving velocity of a person is computed based on a newly acquired image and one or more images acquired earlier. Then, the image processing apparatus 10 detects, from the image, a presence estimated part being a part where a detection target is estimated to be present, based on a result of the determination in S20 (S21).

Further, in parallel with S20 and S21, the image processing apparatus 10 detects a detection target from the image, based on a feature value of appearance of the detection target (S22).

Then, the image processing apparatus 10 outputs information indicating the presence estimated part detected in S21 and information indicating the detection target detected in S22 (S23).

Other configurations of the image processing apparatus 10 according to the present example embodiment are similar to the image processing apparatus 10 according to the first and second example embodiments.

The image processing apparatus 10 according to the present example embodiment can achieve an advantageous effect similar to the image processing apparatus 10 according to the first and second example embodiments. Further, the image processing apparatus 10 according to the present example embodiment performs both of processing of determining a part (a presence estimated part) where a detection target is estimated to be present, based on at least one of a degree of congestion, a line of movement, and a moving velocity of a person included in an image and processing of detecting a detection target, based on a feature of appearance of the detection target. When a feature of appearance of a detection target is captured in an image, the image processing apparatus 10 as described above can detect the detection target, based on the feature of appearance, and, when a feature of appearance of a detection target is not captured in an image, the image processing apparatus 10 as described above can detect the detection target as a presence estimated part, based on at least one of a degree of congestion, a line of movement, and a moving velocity of a person included in the image. Consequently, a detection target in any possible state can be detected with high accuracy.

Fourth Example Embodiment

In the example embodiments described so far, a user can recognize presence or a position of a presence estimated part where a detection target is estimated to be present, based on information output from the image processing apparatus 10, but cannot recognize what kind of detection target is present at the presence estimated part.

An image processing apparatus 10 according to a fourth example embodiment generates and outputs information for recognizing what kind of detection target is present at a detected presence estimated part, based on a "detection result of a detection target object based on a feature of appearance" described in the third example embodiment.

Specifically, the image processing apparatus 10 outputs at least one of
- a detection target object detected near a presence estimated part,
- a detection target object detected at a timing close from a detection timing of a presence estimated part, and
- a detection target object detected near a presence estimated part and detected at a timing close from a detection timing of the presence estimated part,
as a candidate for a detection target object present at the presence estimated part. Hereinafter, description will be given in detail.

Figure 13:
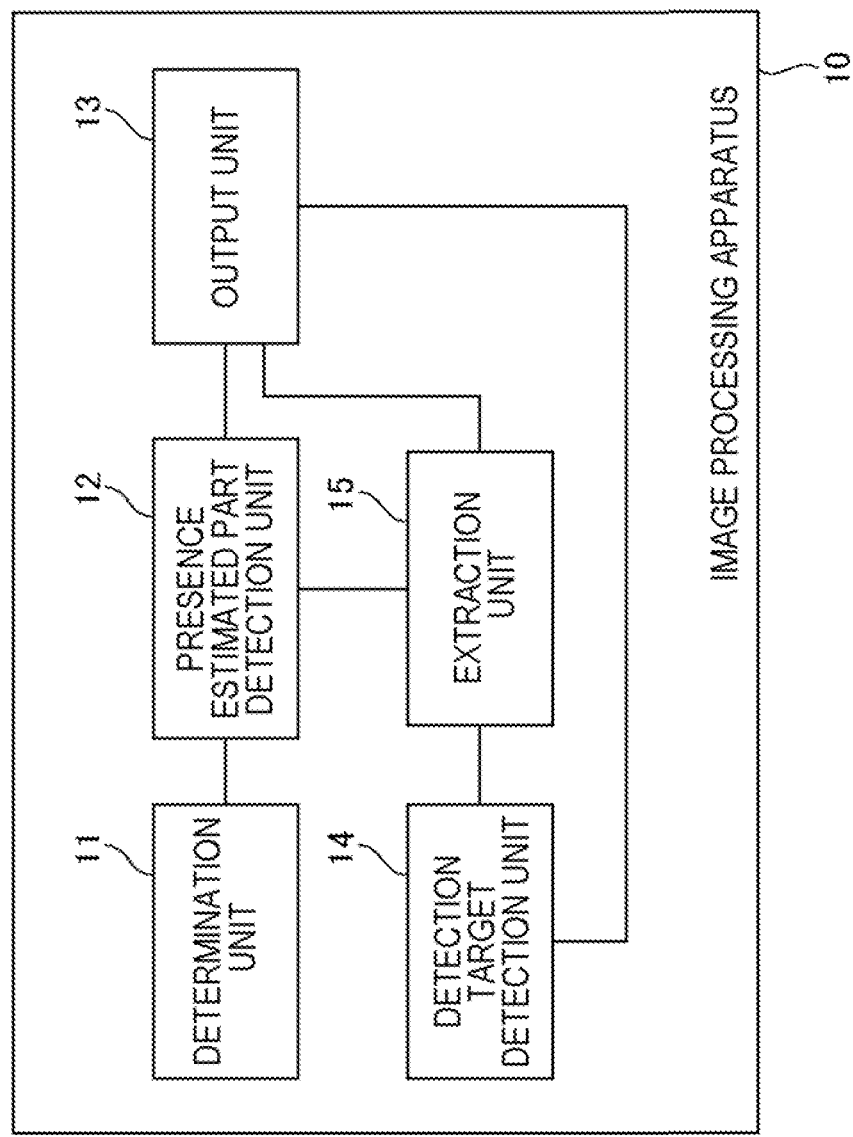
FIG. 13 is a diagram illustrating one example of a function block diagram of an image processing apparatus.

FIG. 13 illustrates one example of a function block diagram of the image processing apparatus 10 according to the present example embodiment. As illustrated, the image processing apparatus 10 includes a determination unit 11, a presence estimated part detection unit 12, an output unit 13, a detection target detection unit 14, and an extraction unit 15.

The extraction unit 15 extracts, from among detection targets detected by the detection target detection unit 14, a detection target satisfying a predetermined condition between the detection target and a presence estimated part detected by the presence estimated part detection unit 12, as a candidate for a detection target present at the presence estimated part.

A predetermined condition includes at least either
- a distance between a detection position of a detection target and a detection position of a presence estimated part is less than a distance reference value, or
- a time difference between a detection timing of a detection target and a detection timing of a presence estimated part is less than a time reference value.

Note that, a predetermined condition may include
- a presence estimated part and a detection target are not concurrently detected within a same image,
in addition to the above condition. When a presence estimated part and a detection target are concurrently detected within a same image, a detection target present at the presence estimated part is not the detection target. By adding the condition to a predetermined condition, a candidate for a detection target present at a presence estimated part can be determined with high accuracy.

The extraction unit 15 may extract, from among detection targets detected earlier than a presence estimated part, a detection target satisfying a predetermined condition between the detection target and the presence estimated part. Further, the extraction unit 15 may extract, from among detection targets detected later than a presence estimated part, a detection target satisfying a predetermined condition between the detection target and the presence estimated part. Further, the extraction unit 15 may detect, from among detection targets detected earlier than a presence estimated part and detection targets detected later than the presence estimated part, a detection target satisfying a predetermined condition between the detection target and the presence estimated part.

The output unit 13 outputs information in which a presence estimated part and a detection target satisfying a predetermined condition between the detection target and the presence estimated part are associated with each other. For example, the output unit 13 causes an output apparatus such as a display, a projection apparatus, or a printer to output information indicating a detected presence estimated part and information indicating a detected detection target.

Figure 14:
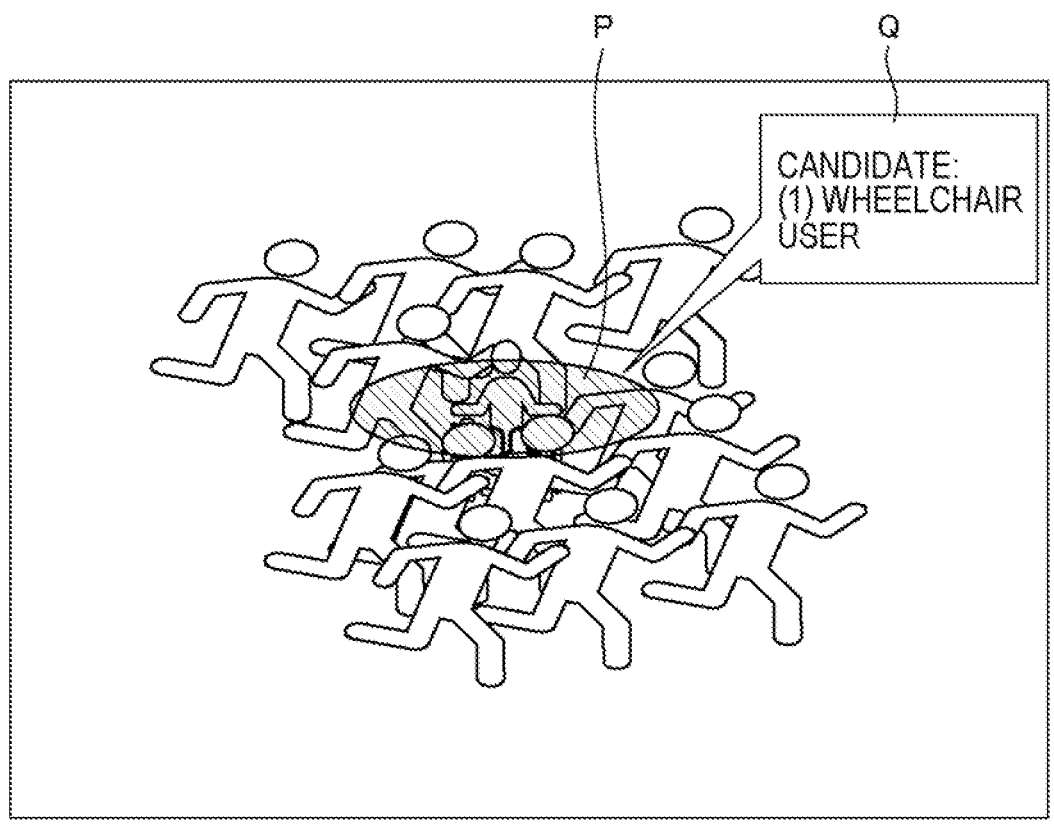
FIG. 14 is a diagram illustrating one example of information output by the image processing apparatus.

For example, the output unit 13 may output an image in which information P indicating a detected presence estimated part and information Q indicating a detection target satisfying a predetermined condition between the detection target and the presence estimated part are associated with each other, and are superimposed on the above-described image processed by the determination unit 11 (the image processed in order to determine at least one of a degree of congestion, a line of movement, and a moving velocity of a person), as illustrated in FIG. 14. Note that, information R indicating a detected detection target may further be displayed.

Note that, the information Q indicating a detection target to be output may include information indicating a detail of a detection result, in addition to information indicating a position of the detection target. For example, the information Q indicating a detection target to be output may include information indicating what is detected (a person whose face image is preliminarily registered, a wheelchair user, a white cane user, a crutch user, a sick person, an injured person, a lost child, other persons who need support, a fallen object, a dropped object, other obstacles, or the like) as a detection target. Further, when a person whose face image is preliminarily registered is detected, the information Q indicating a detection target to be output may further include the preliminarily registered face image.

For example, the image processed by the determination unit 11 may be an image photographed by a surveillance camera, and the image may be displayed on a display in real time for surveillance. Then, the output unit 13 may display the information P indicating a detected presence estimated part and the information Q indicating a detection target satisfying a predetermined condition between the detection target and the presence estimated part, in a way superimposed on the image displayed in real time on the display.

Figure 15:
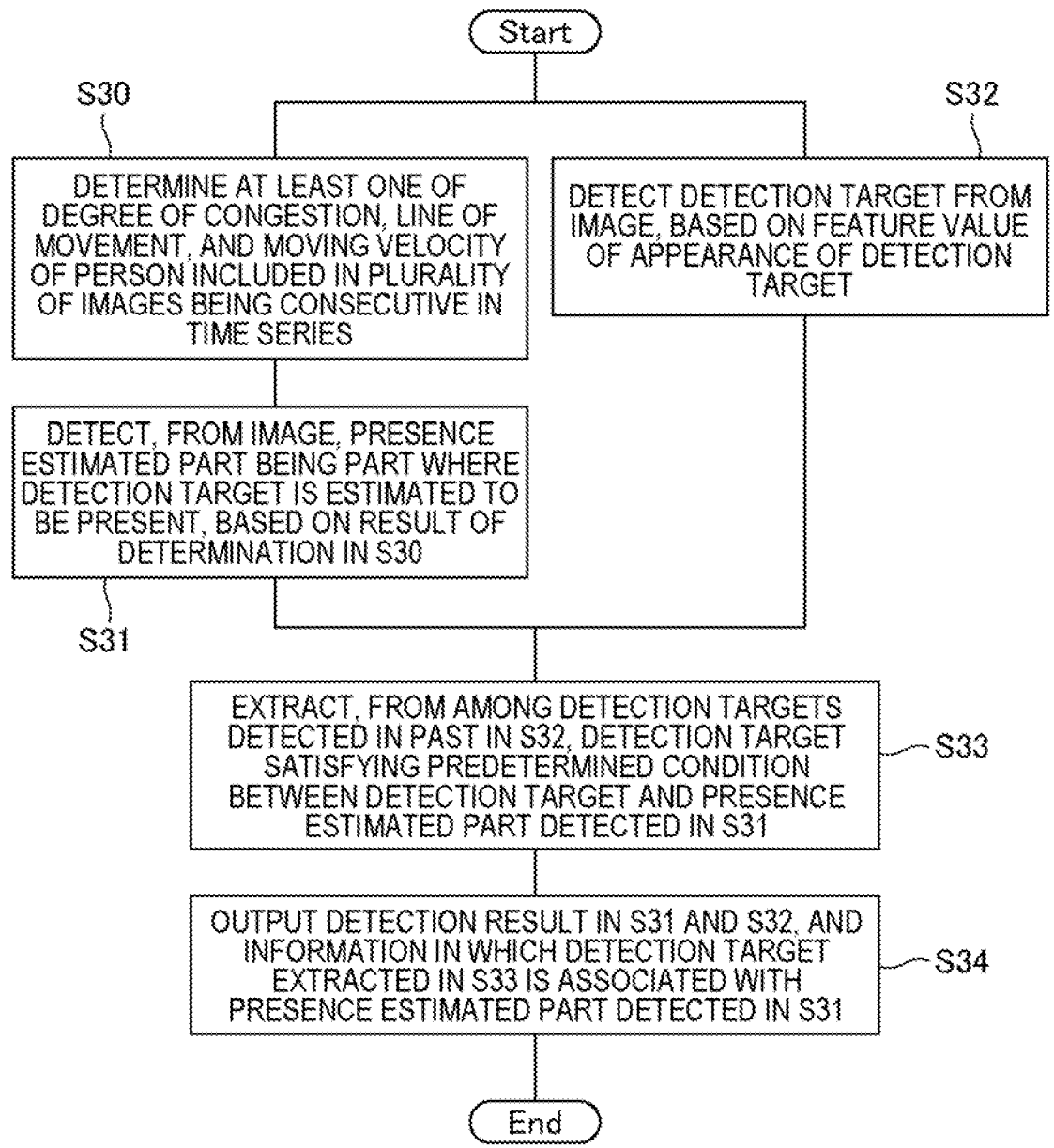
FIG. 15 is a flowchart illustrating one example of a flow of processing of the image processing apparatus.

Next, one example of a flow of processing of the image processing apparatus 10 will be described by using a flowchart in FIG. 15. The image processing apparatus 10 acquires a plurality of images being consecutive in time series in generation order, and repeats processing of S30 to S34 every time acquiring each image.

First, the image processing apparatus 10 determines at least one of a degree of congestion, a line of movement, and a moving velocity of a person included in an acquired image (S30). A line of movement or a moving velocity of a person is computed based on a newly acquired image and one or more images acquired earlier. Then, the image processing apparatus 10 detects, from the image, a presence estimated part being a part where a detection target is estimated to be present, based on a result of the determination in S30 (S31).

Further, in parallel with S30 and S31, the image processing apparatus 10 detects a detection target from the image, based on a feature value of appearance of the detection target (S32).

Then, the image processing apparatus 10 extracts, from among detection targets detected in past in S32, a detection target satisfying a predetermined condition between the detection target and the presence estimated part detected in S31 (S33). Then, the image processing apparatus 10 outputs information in which the presence estimated part detected in S31 and the detection target satisfying the predetermined condition between the detection target and the presence estimated part are associated with each other (S34). Note that, information indicating the detection target detected in S32 may further be output in S34.

Other configurations of the image processing apparatus 10 according to the present example embodiment are similar to the image processing apparatus 10 according to the first to third example embodiments.

The image processing apparatus 10 according to the present example embodiment can achieve an advantageous effect similar to the image processing apparatus 10 according to the first to third example embodiments. Further, the image processing apparatus 10 according to the present example embodiment can output information (the information Q in FIG. 14) indicating a candidate for a detection target estimated to be present at a presence estimated part. A user can recognize presence or a position of a presence estimated part where a detection target is estimated to be present, based on information output from the image processing apparatus 10, and, in addition thereto, can recognize a candidate for a detection target present at the presence estimated part.

Example

An example will be described by using FIG. 16. A system according to the present example is used in a facility or the like where a large number of persons may gather, such as, for example, an amusement park, a station, or a sports facility.

A person who is a scheduled visitor to a facility and requests support from a facility worker accesses, before his/her visit, a transaction control server via a communication apparatus such as a smartphone, a tablet terminal, a mobile phone, or a personal computer, and performs an operation for registration as a person who needs support, for example, an operation of registering his/her own face image. The registration of a face image may be achieved by using an application, a home page, or the like provided by the facility. When the registration operation succeeds, the transaction control server registers the face image in a database of face data.

Then, a surveillance camera is installed at any possible part of the facility. An image photographed by the surveillance camera is transmitted by any means to the transaction control server in real time. The transaction control server transmits the acquired image to a face authentication server, and requests detection of a person (a detection target) registered in the database of face data. The face authentication server executes processing according to the request, and returns a result thereof to the transaction control server.

Further, the transaction control server transmits the acquired image to a video analysis server, and requests an analysis of the image. The video analysis server executes processing of detecting a detection target (example: a wheelchair user, a white cane user, a crutch user, a sick person, an injured person, a lost child, other persons who need support, a fallen object, a dropped object, other obstacles, or the like) other than a person whose face image is preliminarily registered, and processing of detecting a presence estimated part, by using any possible image analysis technique such as a human detection technique, an object detection technique, a pose detection technique, a line-of-movement detection technique, a moving velocity detection technique, or the like. Then, the video analysis server returns a result thereof to the transaction control server.

The transaction control server generates information to be output, based on the results received from the face authentication server and the video analysis server, and displays the information on a terminal for checking a detection result.

In the present example, the image processing apparatus 10 is achieved by the transaction control server, the video analysis server, and the face authentication server.

While the example embodiments of the present invention have been described above with reference to the drawings, the example embodiments are exemplifications of the present invention, and various configurations other than the above can be employed. The configurations of the above-described example embodiments may be combined with each another, or a part of the configurations may be replaced with another configuration. Further, various modifications may be applied to the configurations of the above-described example embodiments, as long as such modifications do not depart from the gist. Further, the configurations and processing disclosed in the above-described example embodiments and the modified examples may be combined with each other.

Further, while a plurality of processes (pieces of processing) are described in order in a plurality of flowcharts used in the above description, execution order of processes executed in each example embodiment is not limited to the described order. The order of the illustrated processes can be changed in each example embodiment, as long as the change does not detract from contents. Further, the above example embodiments can be combined, as long as contents do not contradict each other.

The above example embodiments may also be described in part or in whole as the following supplementary notes, but are not limited thereto.

1. An image processing apparatus including:
    a determination unit that determines at least one of a degree of congestion, a line of movement, and a moving velocity of a person included in a plurality of images being consecutive in time series; and
    a presence estimated part detection unit that detects, from the image, a presence estimated part being a part where a detection target is estimated to be present, based on a result of the determination.

2. The image processing apparatus according to supplementary note 1, wherein
    the presence estimated part detection unit detects a part being surrounded by an area where a degree of congestion of persons is equal to or more than a first congestion reference value, and where a degree of congestion of persons is less than a second congestion reference value, as the presence estimated part.

3. The image processing apparatus according to supplementary note 2, wherein
    the presence estimated part detection unit detects a part being surrounded by an area where a degree of congestion of persons is equal to or more than a first congestion reference value, and where a state in which a degree of congestion of persons is less than a second congestion reference value continues for a predetermined period of time or more, as the presence estimated part.

4. The image processing apparatus according to any one of supplementary notes 1 to 3, wherein
    the presence estimated part detection unit detects a part where no person passes through indicated by a result of the determination, as the presence estimated part.

5. The image processing apparatus according to supplementary note 4, wherein
    the presence estimated part detection unit detects, based on reference information indicating a line of movement of a person in normal times and a result of the determination, a part where a person passes through indicated by the reference information but where no person passes through indicated by a result of the determination, as the presence estimated part.

6. The image processing apparatus according to supplementary note 4 or 5, wherein
    the presence estimated part detection unit detects a part where a state in which no person passes through continues for a predetermined period of time or more, as the presence estimated part.

7. The image processing apparatus according to any one of supplementary notes 1 to 6, wherein
    the presence estimated part detection unit detects a part where a person who moves at a moving velocity of less than a velocity reference value is present, as the presence estimated part.

8. The image processing apparatus according to supplementary note 7, wherein
    the presence estimated part detection unit computes the velocity reference value, based on a moving velocity of a plurality of persons included in the image.

9. The image processing apparatus according to any one of supplementary notes 1 to 8, further including:
    a detection target detection unit that detects the detection target from the image, based on a feature value of appearance of the detection target;
    an extraction unit that extracts, from among the detected detection targets, the detection target satisfying a predetermined condition between the detection target and the detected presence estimated part; and
    an output unit that outputs information in which the presence estimated part and the detection target satisfying the predetermined condition between the detection target and the presence estimated part are associated with each other.

10. The image processing apparatus according to supplementary note 9, wherein
    the predetermined condition includes at least one of
        a distance between a detection position of the detection target and a detection position of the presence estimated part is less than a distance reference value, and
        a time difference between a detection timing of the detection target and a detection timing of the presence estimated part is less than a time reference value.

11. The image processing apparatus according to supplementary note 9 or 10, wherein
    the predetermined condition includes that the presence estimated part and the detection target are not concurrently detected within a same image.

12. An image processing method including, by a computer:
    determining at least one of a degree of congestion, a line of movement, and a moving velocity of a person included in a plurality of images being consecutive in time series; and
    detecting, from the image, a presence estimated part being a part where a detection target is estimated to be present, based on a result of the determination.

13. A program causing a computer to function as:
    a determination unit that determines at least one of a degree of congestion, a line of movement, and a moving velocity of a person included in a plurality of images being consecutive in time series; and
    a presence estimated part detection unit that detects, from the image, a presence estimated part being a part where a detection target is estimated to be present, based on a result of the determination.

REFERENCE SIGNS LIST

10 Image processing apparatus
11 Determination unit
12 Presence estimated part detection unit
13 Output unit
14 Detection target detection unit
15 Extraction unit
1A Processor
2A Memory
3A Input/output I/F
4A Peripheral circuit
5A Bus

The invention claimed is:
1. An image processing apparatus comprising:
    at least one memory configured to store one or more instructions; and
    at least one processor configured to execute the one or more instructions to:

determine at least one of a degree of congestion, a line of movement, and a moving velocity of a person included in a plurality of images being consecutive in time series;

detect, from the image, a presence estimated part being a part where a detection target is estimated to be present, based on a result of the determination;

detect the detection target from the image, based on a feature value of appearance of the detection target;

extract, from among the detected detection targets, the detection target satisfying a predetermined condition between the detection target and the detected presence estimated part; and output information in which the presence estimated part and the detection target satisfying the predetermined condition between the detection target and the presence estimated part are associated with each other.

2. The image processing apparatus according to claim 1, wherein the processor is further configured to execute the one or more instructions to detect the part being surrounded by an area where the degree of congestion of persons is equal to or more than a first congestion reference value, and where a degree of congestion of persons is less than a second congestion reference value, as the presence estimated part.

3. The image processing apparatus according to claim 2, wherein the processor is further configured to execute the one or more instructions to detect the part being surrounded by an area where the degree of congestion of persons is equal to or more than the first congestion reference value, and where a state in which the degree of congestion of persons is less than the second congestion reference value continues for a predetermined period of time or more, as the presence estimated part.

4. The image processing apparatus according to claim 1, wherein the processor is further configured to execute the one or more instructions to detect a part where no person passes through indicated by the result of the determination, as the presence estimated part.

5. The image processing apparatus according to claim 4, wherein the processor is further configured to execute the one or more instructions to detect, based on reference information indicating the line of movement of a person in normal times and the result of the determination, a part where a person passes through indicated by the reference information but where no person passes through indicated by the result of the determination, as the presence estimated part.

6. The image processing apparatus according to claim 4, wherein the processor is further configured to execute the one or more instructions to detect a part where a state in which no person passes through continues for a predetermined period of time or more, as the presence estimated part.

7. The image processing apparatus according to claim 1, wherein the processor is further configured to execute the one or more instructions to detect a part where a person who moves at the moving velocity of less than a velocity reference value is present, as the presence estimated part.

8. The image processing apparatus according to claim 7, wherein the processor is further configured to execute the one or more instructions to compute the velocity reference value, based on a moving velocity of a plurality of persons included in the image.

9. The image processing apparatus according to claim 1, wherein the predetermined condition includes at least one of
a distance between a detection position of the detection target and a detection position of the presence estimated part is less than a distance reference value, and
a time difference between a detection timing of the detection target and a detection timing of the presence estimated part is less than a time reference value.

10. The image processing apparatus according to claim 1, wherein the predetermined condition includes that the presence estimated part and the detection target are not concurrently detected within a same image.

11. An image processing method comprising, by a computer:

determining at least one of a degree of congestion, a line of movement, and a moving velocity of a person included in a plurality of images being consecutive in time series;

detecting, from the image, a presence estimated part being a part where a detection target is estimated to be present, based on a result of the determination;

detecting the detection target from the image, based on a feature value of appearance of the detection target;

extracting, from among the detected detection targets, the detection target satisfying a predetermined condition between the detection target and the detected presence estimated part; and outputting information in which the presence estimated part and the detection target satisfying the predetermined condition between the detection target and the presence estimated part are associated with each other.

12. A non-transitory storage medium storing a program causing a computer to:

determine at least one of a degree of congestion, a line of movement, and a moving velocity of a person included in a plurality of images being consecutive in time series;

detect, from the image, a presence estimated part being a part where a detection target is estimated to be present, based on a result of the determination;

detect the detection target from the image, based on a feature value of appearance of the detection target;

extract, from among the detected detection targets, the detection target satisfying a predetermined condition between the detection target and the detected presence estimated part; and output information in which the presence estimated part and the detection target satisfying the predetermined condition between the detection target and the presence estimated part are associated with each other.

* * * * *